United States Patent
Leroy et al.

(10) Patent No.: US 9,460,226 B2
(45) Date of Patent: Oct. 4, 2016

(54) INDEX REPLICATION IN DISTRIBUTED SEARCH ENGINES

(75) Inventors: Vincent Leroy, Catalunya (ES); Matthieu Morel, Catalunya (ES); Flavio Junqueira, Catalunya (ES)

(73) Assignee: Yahoo! Inc., Sunnyvale, CA (US)

( * ) Notice: Subject to any disclaimer, the term of this patent is extended or adjusted under 35 U.S.C. 154(b) by 442 days.

(21) Appl. No.: 13/536,551

(22) Filed: Jun. 28, 2012

(65) Prior Publication Data

US 2014/0006349 A1    Jan. 2, 2014

(51) Int. Cl.
    *G06F 17/30* (2006.01)
(52) U.S. Cl.
    CPC ................................ *G06F 17/3089* (2013.01)
(58) Field of Classification Search
    CPC ....................... G06F 17/3089; G06F 17/30864
    USPC .......... 707/610, 626, 632, E17.002, E17.108
    See application file for complete search history.

(56) References Cited

U.S. PATENT DOCUMENTS

| | | | | |
|---|---|---|---|---|
| 6,070,191 | A * | 5/2000 | Narendran | G06F 9/505 709/217 |
| 6,266,658 | B1 * | 7/2001 | Adya | G06F 17/30312 |
| 2002/0083118 | A1 | 6/2002 | Sim | 709/105 |
| 2005/0097286 | A1 * | 5/2005 | Karlsson et al. | 711/159 |
| 2006/0268742 | A1 * | 11/2006 | Chu et al. | 370/254 |
| 2007/0033158 | A1 * | 2/2007 | Gopalan | G06F 19/20 |
| 2007/0143271 | A1 * | 6/2007 | Yuval et al. | 707/3 |
| 2009/0157666 | A1 * | 6/2009 | Gehrke | G06F 17/30864 |
| 2009/0210549 | A1 * | 8/2009 | Hudson et al. | 709/231 |
| 2011/0072206 | A1 * | 3/2011 | Ross et al. | 711/108 |
| 2012/0226661 | A1 * | 9/2012 | Kenthapadi et al. | 707/634 |
| 2012/0233176 | A1 * | 9/2012 | Korn | G06F 21/6227 707/747 |

* cited by examiner

*Primary Examiner* — Shiow-Jy Fan
(74) *Attorney, Agent, or Firm* — Berkeley Law & Technology Group, LLP

(57) ABSTRACT

Briefly, embodiments of methods or systems to replicate indexes are described. According to an embodiment, a method may include executing instructions by one or more processors to bring about generating a first replication threshold of documents to be replicated at a local computing site and a second replication threshold of document entries to be stored in a posting list at the local computing site.

15 Claims, 3 Drawing Sheets

INDEX REPLICATION IN DISTRIBUTED SEARCH ENGINES

BACKGROUND

1. Field

This disclosure relates to replicating certain information stored at a computing site as a result of one or more user queries submitted to a search engine.

2. Information

In a conventional search engine, a large number of documents may be stored at a centralized location that may be accessible to multiple users of a search service. A centralized location may therefore include copies of many millions or even billions of articles, reports, literary works, web pages, and other documents. By way of locating all searchable documents into a single, centralized site, users of a search engine may be assured that results of search queries are comprehensive and immediately available.

However, use of a single, centralized location for all searches conducted by users from remote locations across the world may place incredible demands on communication links that connect the remote locations with the centralized search engine location. In addition, coordination of a large number of searches, in which thousands of searches may be conducted in a single second, may also place extraordinary demands on the computer processing resources of the centralized search site so that results to search queries can be provided without noticeable delay. Accordingly, it may be useful to distribute search engines across a variety of locations so as to enhance the performance of the processing resources at the individual sites and to reduce demands on a telecommunications infrastructure that may link users to individual search engine sites. However, at least in some instances, distribution of search engines across a wide area may introduce additional complexities.

BRIEF DESCRIPTION OF DRAWINGS

Claimed subject matter is particularly pointed out and distinctly claimed in the concluding portion of the specification. However, both as to organization and/or method of operation, together with objects, features, and/or advantages thereof, claimed subject matter may best be understood by reference to the following detailed description if read with the accompanying drawings in which:

Figure 1:
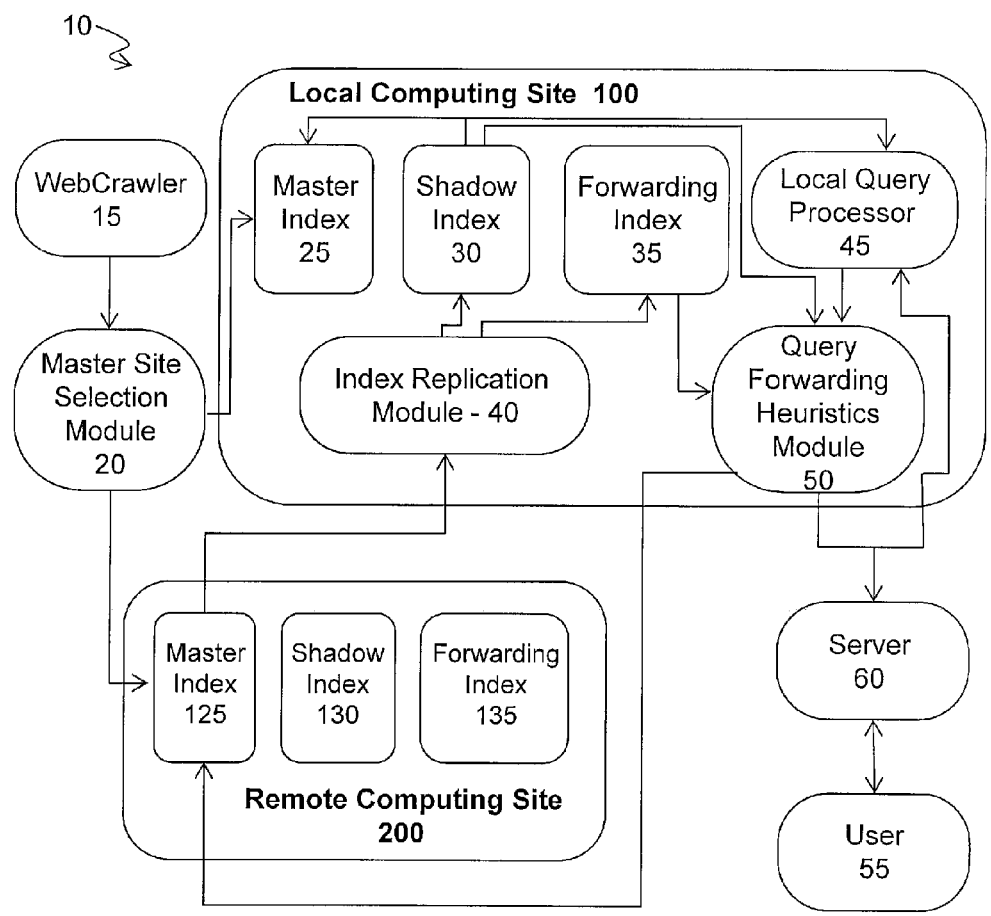
FIG. 1 is a schematic diagram of an embodiment of a system for index replication in distributed search engines.

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

Reference throughout this specification to "one example," "one feature," "one embodiment," "an example," "a feature," or "an embodiment" means that a particular feature, structure, or characteristic described in connection with the feature, example, or embodiment is included in at least one feature, example, or embodiment of claimed subject matter. Thus, appearances of the phrase "in one example," "an example," "in one implementation," "an implementation," "an embodiment," or "in one embodiment" in various places throughout this specification are not necessarily all referring to the same feature, example, or embodiment. Furthermore, particular features, structures, or characteristics may be combined in one or more examples, features, or embodiments.

Media networks, such as the Yahoo!™ network, for example, are increasingly seeking ways to keep users within their networks. A media network may, for example, comprise an Internet website or group of websites having one or more sections, for example. For example, the Yahoo!™ network includes websites located within different categorized sections, such as sports, finance, news, and games, to name just a few among possible non-limiting examples. A media network may comprise an Internet-based network or a non-Internet based network, for example.

The more users who remain within a media network for an extended period of time, the more valuable a network may become to potential advertisers and, typically, the more money advertisers may pay to advertise to users, for example, via that media network. In an implementation, searching or use of search engines, often provided to a user of a client device via a server or other type of computing platform located at a computing site, for example, may deliver relevant documents or links, such as hyperlinks, to relevant content, to entice users accessing documents to remain within a network for a relatively extended period of time. Links to documents, such as to websites located outside of a media network, may also be presented to users. For example, even if users are directed to websites outside of a particular media network, users may, in effect, remain loyal to the media network in the future if they believe that the media network provides links or otherwise directs them to relevant content as a result of submitting a search query.

Accordingly, if user submits a query to a search engine managed by a media network, the user may expect accurate and comprehensive search results to be returned by the search engine. If the quality of the search results is perceived as lacking, (e.g. meaning that fewer and/or less irrelevant documents are returned by the search engine) the user may resubmit the query to the media network or may proceed with a decision-making activity using incomplete or perhaps less relevant search results. This may be of particular concern, for example, if a search engine is distributed over multiple computing sites as opposed to a search engine being positioned at a single location.

According to one or more implementations, as discussed herein, a distributed search engine comprising a local computing site and one or more remotely located sites may, for example, in response to a query supplied by a user to a local computing site, request certain information from remote computing sites of the search engine for replication at the local computing site. Such replication may be "reactive" in that, for example, replication may occur in response to particular keywords or search terms present in user queries. Replication may be performed by a local computing site by computing a first replication threshold that identifies attributes of one or more documents from a remote computing site. The one or more documents requested from the remote computing site may, for example, be stored within and indexed by a shadow index operating in conjunction with a main index of documents previously allocated for storage at a local computing site. In addition to replication of entire documents, a local computing site may request references to one or more documents located at remote sites for replication in a posting list stored at the local computing site. Such replication may, for example, be responsive to computation of a second replication threshold, which may determine that entries of one or more posting lists stored at a remote computing site are to be replicated at a local computing site.

According to one or more implementations, as discussed herein, a non-transitory storage medium comprising machine-readable instructions stored thereon, which are executable by processor of a local computing unit, to compute first and second replication thresholds. A first replication threshold may identify attributes of one or more documents for storage on a shadow index accessible to one or more processing units at the local computing site, and a second replication threshold may identify attributes of one or more document entries of at least one posting list accessible to the one or more processing units of the local computing site.

In implementations, the term "user" may refer to an individual for which one or more characteristics are known or may be estimated, for example. A user may be registered within a particular media network, for example. A user may be identified based at least in part on an identifier, such as a user name, cookie, or other identifier associated with the user and which may be stored on a computer or other access device of the particular user, for example. The term "document" is intended to refer to a broad range of content from websites comprising text files, word files, audio or video clips, documents encoded using Portable Document Format (PDF) or by way of any other data structure, emails, as well as documents encoded in other forms.

FIG. 1 is a diagram illustrating an embodiment of a system 10 for index replication in distributed search engines. In FIG. 1, web crawler 15 may operate as a computer program that browses the World Wide Web in a methodical, automated manner or in some other orderly fashion. Web crawler 15 may be any type of device for gathering documents by evaluating one or more universal resource locators (URLs) and directing or assisting with providing documents to master site selection module 20. In particular implementations, master site selection module 20 may assign and/or index documents detected by way of web crawler 15 to master index 25. However, it should be noted that although the implementation of FIG. 1 may make use of web crawler 15 operating in conjunction with master site selection module 20, other implementations may allocate or assign documents to master index 25 using alternate mechanisms or arrangements, and claimed subject matter is not limited in this respect.

In implementations, master site selection module 20 may assign documents to master index 25 of local computing site 100 based, at least in part, on content present in documents. In some implementations, by selecting particular local computing sites, more efficient user query processing may be achieved, which be consistent with the principle that many queries originate from users from within particular localities. In one possible example, documents that include keywords or search terms related to shipbuilding at Newport News Va. may be assigned to a local computing site perhaps near Newport News, Va., in the United States of America. In another possible example, queries concerning British soccer play may predominantly originate from areas within Great Britain.

In certain implementations, user 55 may initiate a search query to server 60 using, for example, search terms $t_1$, $t_2$, and $t_3$, which may represent a few of numerous search terms from a query comprising search terms $[t_1, \ldots, t_q]$. In one possible example among many, the search terms "fast," "sporty," and "economical" may be used in a query from user 55 while shopping for an automobile or other vehicle, for example. In the example of FIG. 1, local query processor 45 may receive the search query from user 55 and provide results via server 60. Search query results may comprise one or more snippets, clips, images, links or other partial replications of documents stored in master index 25 of local computing site 100.

In some implementations, web crawler 15 may at least assist in indexing documents which may be stored in master index 25, for example. In certain implementations, indexing may be performed incrementally wherein the addition, deletion, or update of indexed documents may be performed without fully regenerating an index, for example. Incremental indexing may be used, for example, in the case of large-scale Web search engines where a cost of regenerating a full index may be prohibitive. Regenerating a full index may also introduce an undesirable delay between the time that changes may be introduced into a document and the time that the changes are indexed by a web crawler. However, claimed subject matter is not limited to document indexes generated in any particular fashion.

In some implementations, local query processor 45 may rank documents stored within master index 25 in accordance with a typical ranking function, for example, which may comprise the following expressions:

$$s(d \mid q) = w_f f(d) + \frac{w_g}{|q|} \sum_{i=1}^{|q|} g(d \mid t_i) \qquad (1)$$

$$r(d \mid t) = w_f f(d) + w_g g(d \mid t) \qquad (2)$$

$$s(d \mid q) = \frac{1}{|q|} \sum_{i=1}^{|q|} r(d \mid t_i) \qquad (3)$$

In the above expressions, s(d/q) may represent a ranking function in which $w_f$ and $w_g$ represent weighting factors for the functions f(d) and g(d/t), respectively. The function f(d) represents a query-independent term which may combine, for example, a spam score, a link-analysis measure, or a PageRank score that assigns numerical weighting to each element of a hyperlinked set of documents to measure a document's relative importance within the set of "q" query search terms. The partial score or other attribute of a document (d) with respect to a user-generated search term (t) may be expressed by r(d/t), and may be maintained in posting lists of the index to improve query evaluation performance. As shown in expression (3), for example, an overall document ranking s(d/q) may be expressed in terms of a summation of "q" partial scores of a document, as expressed by r(d/t) for a search term t. In other implementations, however, overall document rankings may be based on other attributes of a document, and claimed subject matter is not limited in this respect.

In an implementation, for a search term (t) of a user-generated query comprising the search terms $[t_1, \ldots, t_q]$, a posting list of the top-k documents, wherein, for example, "k" may be an integer approximately equal to 10. However, in other implementations, different integer values for "k" may be used, such as integers less than 10, such as 8, or 9, or integers greater than 10, such as 11, 12, or perhaps 25 or more. In an example, a conventional non-random-access (NRA) algorithm may be used to maintain a sorted stack of potential top-k results with upper and lower bounds for an overall score of documents, such as may be included in expression (3) for s(d/q). In an example implementation, upper and lower bounds may be updated as query processing progresses down one or more posting lists. In one implementation, as processing progresses, if an upper bound for the $(k+1)^{th}$ document is lower than the lower bound of the $k^{th}$ document, the top-k results are identified and the non-random-access algorithm may terminate. In one possible example, a typical non-random-access algorithm may process full posting lists, however, in at least some implementations, only a fraction of documents in master index 25 and shadow index 30 may be processed.

In an example implementation, posting lists relevant to search terms $t_1$, $t_2$, and $t_3$ may be expressed in Tables 1, 2, and 3, below:

TABLE 1

| | |
|---|---|
| $td_{t_1}$ → | $d_{238}$ - 24.5 |
| | $d_{789}$ - 24.2 |
| | $d_{555}$ - 23.1 |
| $tp_{t_1}$ → | $d_{358}$ - 22.8 |

TABLE 2

| $t_2$ |
|---|
| $d_{657}$-18.3 |
| $d_{745}$-17.9 |
| $d_{555}$-17.3 |
| $d_{618}$-17.0 |
| $d_{194}$-16.7 |

TABLE 3

| $t_3$ |
|---|
| $d_{675}$-17.1 |
| $d_{348}$-16.2 |
| $d_{135}$-14.9 |

In an example, Tables 1, 2, and 3 may include document identifiers, such as $d_{238}$, $d_{657}$, $d_{675}$, and so forth. In at least one possible implementation, table entries include document identifiers and corresponding partial scores assigned, for example, in accordance with expression 2. Table entries may represent posting lists of forwarding index 35 of FIG. 1 and may be used by query forwarding heuristics module 50 to determine whether a search query should be forwarded to one or more remote computing sites, such as remote computing site 200.

In one illustrative example among many possible examples, consider that documents $d_{238}$ and $d_{789}$ of Table 1 are replicated within shadow index 30 of FIG. 1. Thus, if documents $d_{238}$ and $d_{789}$ are already present within local computing site 100, for example, these documents need not be considered for forwarding to one or more of remote computing sites, such as remote computing site 200. However, a third entry of Table 1, document $d_{555}$, shown as having a partial score with respect to search term $t_1$ of 23.1, for example, may not be replicated within either one of master index 25 or shadow index 30. Further in this example, it can be seen that document $d_{555}$, is also present in Table 2 and having a partial score of 17.3 with respect to search term $t_2$. The assignment of partial scores may be performed, at least in some implementations, as the top-k algorithm progresses.

However, as the top-k algorithm progresses, it may be seen that, for this example, document $d_{555}$ is not present in Table 3, which indicates partial scores of documents with respect to search term $t_3$, for example. Further, the final entry of Table 3 is shown as representing document $d_{135}$, for example. Accordingly, an upper bound score computed for document $d_{555}$, may be expressed as a summation of the partial scores corresponding to $d_{555}$ from Tables 1 and 2 in addition to the final entry of Table 3, for example. Accordingly, an upper bound score for $d_{555}$ may be expressed as:

$$\text{Upper bound } d_{555} = (23.1 + 17.3 + 14.9)/3 = 18.4 \qquad (4)$$

Further, a bound on a score of a document absent from these posting lists may be computed using the scores of the final entries for Tables 1, 2, and 3, at least for this example, which may be 22.8, 16.7, and 14.9, respectively. According to certain implementations, query forwarding heuristics module 50 may compute a highest possible score for a document that is not indexed at local computing site 100 (e.g. in master index 25 or in shadow index 30) using forwarding index 35. The highest possible score, which may comprise one or more entries stored in forwarding index 35, for example, may be compared with scores of local documents, such as $d_{555}$ which may be stored within local computing site 100.

In the example involving Tables 1, 2, and 3, if documents $d_{238}$, $d_{789}$, $d_{657}$, and $d_{675}$ are present within one or more of master index 25 and or shadow index 30, a search query that may originate from user 55 may be forwarded, such as by way of query forwarding heuristics module 50, to one or more remote computing sites, such as remote computing site 200. In particular implementations, user queries may be forwarded to remote computing sites depending on partial information pertaining to documents assigned to remote computing sites. Accordingly, in one example among numerous possible examples, $d_{555}$, $d_{358}$, $d_{745}$, $d_{618}$, $d_{194}$, $d_{348}$, $d_{135}$ may be stored at a remote computing site 200 but not at local computing site 100. In FIG. 1, remote computing site 200 may include master index 125, shadow index 130, forwarding index 135, as well as other hardware and/or software elements corresponding to hardware and/or software elements of local computing site 100.

In implementations, a replication algorithm may be performed by index replication module 40 with respect to search term t, which may be used to index documents and entries of posting lists. A replication algorithm may, for example, be performed after query results have been delivered to user 55, so that future queries from user 55 or queries submitted by other users may be answered with reduced query forwarding.

Index replication module 40 may develop and/or maintain two different replication thresholds which may be expressed in partial score values computed by way of expression 2, for example. In Table 1, for example, a first replication threshold, $td_{t1}$, may indicate a document attribute, such as a partial score with respect to search term $t_1$, above which documents may be replicated in shadow index 30. In Table 1, for example, $td_{t1}$ corresponds to document $d_{789}$, which may imply that documents having an attribute, such as a partial score with respect to $t_1$, of 24.2 or greater may be stored in shadow index 30. Documents having an attribute, such as a partial score with respect to $t_1$, of less than 24.2, such as document $d_{555}$ may be allowed to continue to be stored only at locations other than local computing site 100

A second replication threshold, $tp_{t1}$, which may be developed by index replication module 40, may indicate an attribute, such as a partial score with respect to a search term $t_1$, that may correspond to an entry in one or more posting lists of forwarding index 35. In Table 2, for example, $tp_{t1}$ corresponds to document $d_{358}$, which may imply that documents having a partial score of greater than 22.8 are entered into the posting list for search term $t_1$, for example.

Thus, in many implementations, lowering one or more of $td_{t1}$ and $tp_{t1}$, may lead to in an increase in the number of documents and entries of posting lists stored at local computing site 100. Increases may continue, by way of lowering one or more of $td_{t1}$ and $tp_{t1}$, until a replication budget for a given local computing site, such as site 100, has been reached. In many implementations, replicating a document may be many times more costly and consume more memory than replicating a posting list. In one example, replicating a document may consume 250 times the amount of memory consumed by replicating an entry of a posting list. Thus, a split parameter, such as $\alpha$, may be assigned to index replication module 40 to allocate replication among documents and posting lists stored within local computing site 100.

Accordingly, after queries are performed and results delivered to user 55, index replication module 40 may compute first and second replication thresholds by way of the following expressions:

$$td_t = \alpha \times |q| \times w \tag{5}$$

$$tp_t = \frac{(1-\alpha)|q| \times w}{|q|-1} \tag{6}$$

Wherein by way of a computing s(d/q), such as by way of expression 1, it can be verified that for all documents present in a single posting list stored in forwarding index 35, for example with respect to a particular search term, $t_1$ (for i=1), for example, query forwarding heuristics module 50 may compute s(d/q) having an upper bound which is at most equal to w:

$$\forall t \in q, \tag{7}$$

$$\frac{1}{|q|}\left(td_t + \sum_{u \in q-(t)} tp_u\right) = w$$

In implementations, replicating a document provides corresponding entries in a posting list. Thus, $td_t \geq tp_t$. Consequently, at least in many implementations, $|q| \geq 2$ and $\alpha \geq 0.5$. Hence, for relatively low values of $\alpha$, index replication module 40 may replicate a greater number of documents, which may increase the likelihood of query results being stored in master index 25 or in shadow index 30. However, for relatively low values of $\alpha$, query forwarding heuristics module 50 may be less likely to accurately compute forwarding heuristics, such as $td_{t1}$ and $tp_{t1}$ of Table 1, for example. In other implementations, which may make use of higher values of $\alpha$, query forwarding heuristics module 50 may be more likely to accurately compute forwarding heuristics, such as $td_{t1}$ and $tp_{t1}$, for example, but shadow index 30 may comprise fewer replicated documents. This may decrease a likelihood that relevant documents may be stored in master index 25 or in shadow index 30.

In particular implementations, it may be desirable for local computing site 100 to estimate an amount of documents or postings a replication decision represents prior to deciding whether such a decision should be applied. In an example that may make use of the replication thresholds of expressions 5 and 6, a two-term search query comprising search terms $t_4$ and $t_5$ may result in index replication module 40 computing a first replication threshold, $td_t$, and a second replication threshold, $tp_t$, using an $\alpha=0.6$ as:

$$\begin{aligned} td_t &= \alpha \times |q| \times w \\ &= .6 \times 2 \times 8.5 \\ &= 10.2 \end{aligned} \tag{5a}$$

$$\begin{aligned} tp_t &= \frac{(1-\alpha)|q| \times w}{|q|-1} \\ &= \frac{(1-.6)|2| \times 8.5}{|2|-1} \end{aligned} \tag{6a}$$

Thus, in a possible implementation, a conventional top-k non-random-access algorithm for k=10 may identify a group of 10 documents having relatively higher partial scores with respect to search term $t_4$ as summarized in the top line of Table 4 (below). The 10 posting list entries having relatively higher partial scores with respect to search term $t_5$ are summarized in the top line of Table 5 (below). Further, Tables 4 and 5 may also identify second, third, and fourth groups of 20, 40, and 80 documents, respectively, having partial scores for documents and posting list entries for different upper and lower bounds as shown and further described below:

TABLE 4

| Document Index for $t_4$ | |
| --- | --- |
| 1/10 | Upper = 15.7, Lower = 12.7 |
| 2/20 | Upper = 12.7, Lower = 9.8 |
| 3/40 | Upper = 9.8, Lower = 7.3 |
| 4/80 | Upper = 7.3, Lower = 4.8 |

TABLE 5

| Posting Index for $t_5$ |
| --- |
| Upper = 17.1, Lower = 15.3 |
| Upper = 15.3, Lower = 13.7 |
| Upper = 13.7, Lower = 6.4 |
| Upper = 6.4, Lower = 1.8 |

A group of the top-k documents (where k=10) in line 1 of Table 4 may pertain to documents having a bound for an upper partial score of 15.7 and a bound for a lower partial score of 12.7, with respect to search term $t_4$. Thus, a first group of documents may be annotated as 1/10 as shown in Table 4. A posting list of the top-k (k=10) documents having a bound for an upper partial score of 17.1 and a lower bound of 15.3, with respect to search term $t_5$ is shown in Table 5. In Tables 4 and 5, additional groups of documents within particular upper and lower bounds may also be identified or estimated, such as by way of an algorithm or by occasionally probing remote computing sites, such as remote computing site 200. For example, a second group of 20 documents, identified as 2/20, having an upper bound of 12.7 and a lower bound of 9.8 with respect to search term $t_4$, or having an upper bound of 15.3 and a lower bound of 15.7 with respect to a posting list for search term $t_5$, may be identified or estimated.

In the examples of Tables 4 and 5, documents having attributes (e.g. partial scores) within lower bounds may be more numerous. For example, in Tables 4 and 5, 20 documents may include attributes, such as partial scores, with respect to particular search terms. For example, a third group of 40 documents, which may be identified as 3/40, may comprise a partial score with respect to search term $t_4$ of between 9.8 and 7.3, and a fourth group of 80 documents, which may be identified as 4/80, may be identified as having a partial score with respect term $t_4$ of between 7.3 and 4.8. In a corresponding manner, a third group of 40 posting list entries may be identified as comprising a partial score with respect to search term $t_5$ (Table 5) of between 13.7 and 6.4, and a fourth group of 80 posting list entries may be identified as having a partial score with respect term $t_4$ of between 6.4 and 1.8

Thus, in view of expression 5a, for example, in which $td_t$ is computed (equal to 10.2), index replication module 40 may determine that document groups 1/20 and 2/40 should be replicated within shadow index 30. Although the lower bound of document groups 2/40 equals 9.8, module 40 may indicate one or more additional documents, such as those comprising a partial score of between 9.8 and 10.2.

Further, and in view of equation 6a, for example, in which $tp_t$ is computed (equal to 6.8), index replication module 40 may determine that one or more of first, second, and third document postings should be replicated within forwarding index 35. Although the lower bound of posting lists group 3/40=16.8, module 40 may indicate that one or more additional postings, such as those comprising a partial score of between 6.4 and 6.8, should be replicated.

Since entries of Table 4 pertain to documents stored within, for example, shadow index 30, and entries of Table 5 pertain to documents of posting lists stored in forwarding index 35, certain implementations may include repeating the operations for posting list entries with respect to search term $t_4$ and document indexes with respect to search term $t_5$. Further, it should be noted that the discussion of Tables 1-5 herein is merely intended as an illustrative example and claimed subject matter is not limited in this respect.

Figure 2:
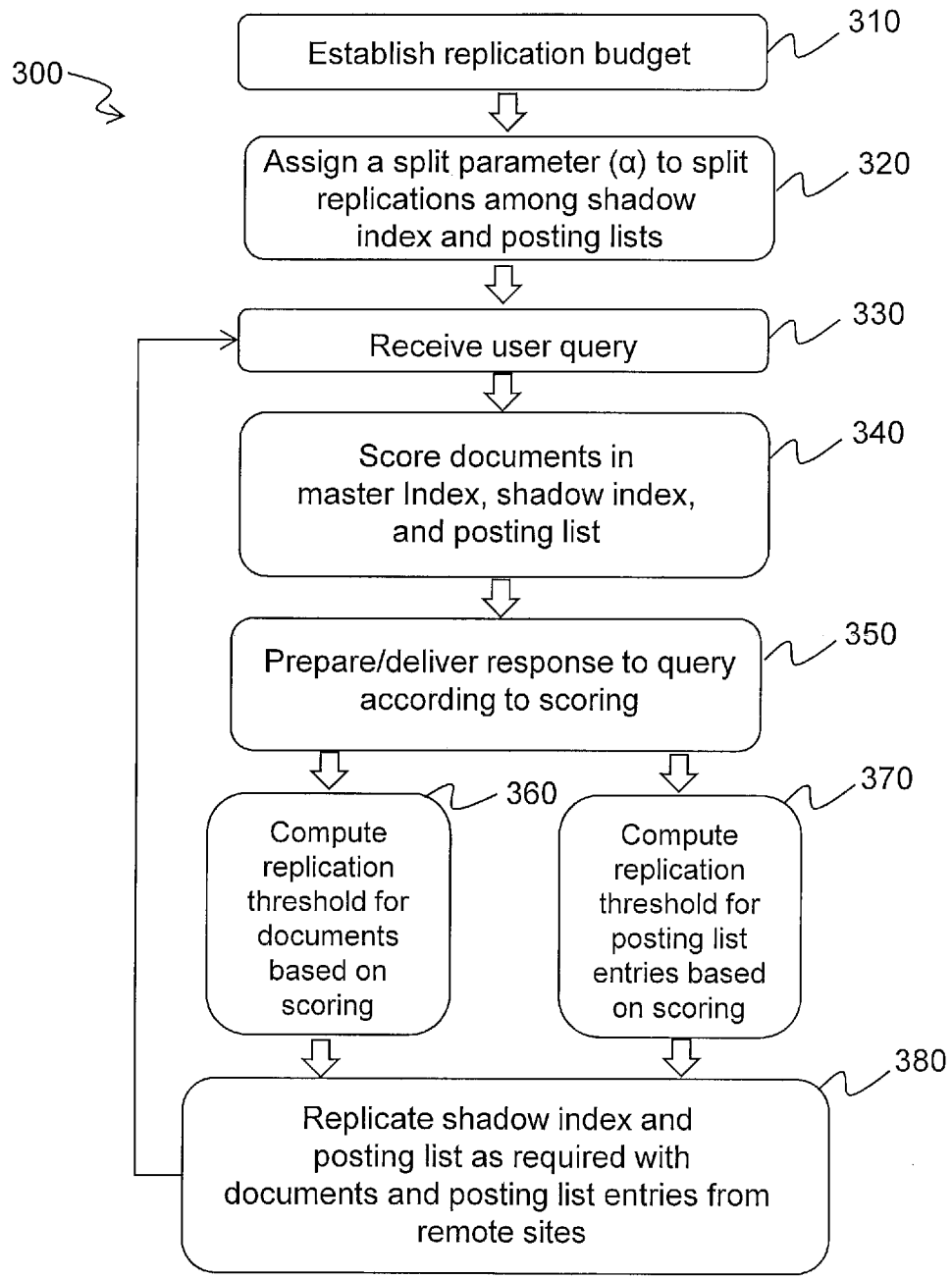
FIG. 2 is a flow diagram of an embodiment of index replication in distributed search engines.

FIG. 2 is a flow diagram illustrating an embodiment of index replication in distributed search engines. In some embodiments, the apparatus of FIG. 1 may be suitable for performing the method of FIG. 2, although nothing prevents performing the method of FIG. 2 using alternate arrangements of components in other embodiments. Embodiments of claimed subject matter may include additional blocks other than those shown and described in FIG. 2, fewer blocks than those shown and described, blocks occurring in an order different from FIG. 2, or any combination thereof.

The method of FIG. 2 may begin at block 310, in which a replication budget may be received. In certain implementations, a replication budget may reflect a hardware, software, and or system constraint for resources available at a given computing site. A replication budget may be expressed as a maximum number of documents that can be replicated at a computing site, such as 100,000, 1.0 million, 20.0 million, or other measure of capacity storage and/or processing capacity, for example. The method may proceed at block 320, wherein a split parameter, such as α, is assigned to allocate replication among documents and posting lists by a computing site.

At block 330, a query from a user may be received at a computing site. A query may include, for example, two or more search terms expressed in a conjunctive form. At block 340, a computing site may score documents, such as by assigning partial scores or other attributes with respect to particular terms of a search query, to documents stored in a master index or a shadow index, for example. Block 340 may also include a computing site assigning partial scores or other attributes to entries of a posting list stored in a forwarding index of a computing site.

In certain implementations, block 340 may be performed prior to block 330. In one example implementation, a computing site may score documents located in a master index, a shadow index, or referenced in one or more posting lists prior to receipt of a search query. This may allow a computing site to more quickly respond to a user query given that partial scores for a variety of possible search terms may already be available prior to receipt of a user search query.

Continuing at block 350, responses to a received search query may be prepared and delivered a user. In an implementation, a conventional non-random-access algorithm may deliver the top-k, wherein k may be equal to 10, for example, results to a user. The results may include references to documents stored at a computing site as well as the documents referenced in a posting list stored at computing site. Block 350 may also include forwarding a query to a remote computing site if a forwarding heuristic determines that documents stored or referenced in a posting list at a local computing site are unlikely to represent search results comprising the highest scoring documents.

The method may continue at blocks 360 and 370, in which replication thresholds for documents may be computed such as in block 360. At block 370, replication thresholds for entries of one or more posting lists may be computed. At block 380, an index replication module may replicate, perhaps at a local computing site, those documents and posting list entries having an increased likelihood of representing search results comprising the highest scoring documents for delivery in response to future search queries from users. The method may then return to block 330, in which the next user query is received.

Figure 3:
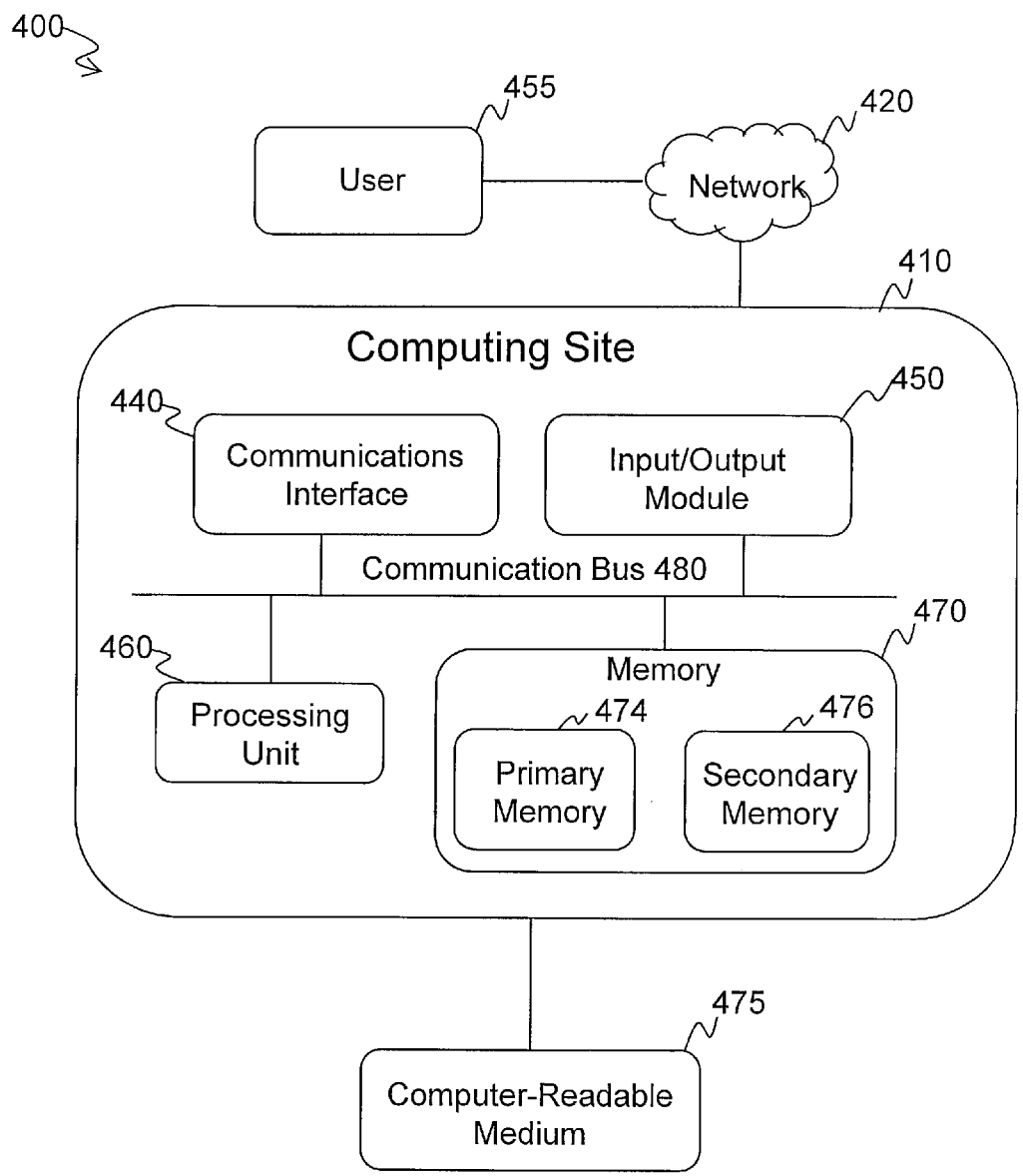
FIG. 3 is a schematic diagram of details of a computing site that may be employed in a system for index replication in distributed search engines according to an embodiment.

FIG. 3 is a diagram illustrating details of a computing site that may be employed in a system for index replication in distributed search engines. In FIG. 1 (400), computing site 410 may interface with network 420 to forward search queries and to receive documents and posting list entries, for example, from remote computing sites. Communications interface 440, input/output module 450, one or more processing units, such as processing unit 460, and memory 470, which may comprise primary memory 474 and secondary memory 476, may communicate among one another by way of communication bus 480, for example. In FIG. 1, user 455 may communicate with computing site 410 by way of an Internet connection through network 420, wherein such communication may comprise search queries submitted by user 455 and receiving results of search queries. Although the computing site of FIG. 3 shows the above-identified elements, claimed subject matter is not limited to computing sites comprising only these elements as other implementations may include alternative arrangements that may include additional components, fewer components, or components that function differently while achieving similar results.

User 455 may make use of client resources that may comprise a browser utilized to, e.g., view or otherwise access documents, such as, from the Internet, for example. A browser may comprise a standalone application, or an application embedded in or forming at least part of another program or operating system, etc. Client resources may also include or present a graphical user interface. An interface, such as GUI, may include, for example, an electronic display screen or various input or output devices. Input devices may include, for example, a microphone, a mouse, a keyboard, a pointing device, a touch screen, a gesture recognition system (e.g., a camera or other sensor), or any combinations thereof, etc., just to name a few examples. Output devices may include, for example, a display screen, speakers, tactile feedback/output systems, or any combination thereof, etc., just to name a few examples. In an example embodiment, user 455 enter may submit a search request that may include search terms and may receive results of submitted search queries via an interface, although claimed subject matter is not limited in scope in this respect. Signals may be transmitted via client resources to a server system via a communications network, for example. A variety of approaches are possible and claimed subject matter is intended to cover such approaches.

Processing unit 460 may be representative of one or more circuits, such as digital circuits, to perform at least a portion of a computing procedure or process. By way of example but not limitation, processing unit 460 may comprise one or more processors, controllers, microprocessors, microcontrollers, application specific integrated circuits, digital signal processors, programmable logic devices, field programmable gate arrays, and the like, or any combination thereof. In an implementation, processing unit 460 may be capable of executing machine-readable instructions to compute, in response to a search query received from user 455, for example, to compute a first replication threshold identifying attributes of one or more documents from a remote computing site to be replicated at a local computing site and to compute a second replication threshold determining, at least in part, that at least one entry of a posting list stored at the remote computing site should be replicated at a local computing site. Thus, for example, processing unit 460 may be capable of performing the functions of an index replication module, a local query processor, and a query forwarding heuristics module, for example, as described herein.

Memory 470 may be representative of any storage mechanism. Memory 70 may include, for example, primary memory 474 and secondary memory 476, although nothing prevents a use of additional memory circuits, mechanisms, or combinations thereof. Memory 470 may comprise, for example, random access memory, read only memory, or one or more data storage devices or systems, such as, for example, a disk drive, an optical disc drive, a tape drive, a solid state memory drive, to name just a few examples. Memory 470 may be utilized to store a first number of documents in master index as well as a second number of documents in a shadow index. Memory 470 may be additionally utilized to store one or more posting lists by way of a forwarding index stored within a memory. Memory 470 may also comprise a memory controller for accessing computer readable-medium 475 that may carry and/or make accessible content, code, and/or instructions, for example, executable by processing unit 460 or some other controller or processor capable of executing instructions, for example. Although computer readable-media 475 is shown in FIG. 3 as detached from computing site 410, nothing prevents inclusion of the computer-readable media within the enclosure of computing site 410, and claimed subject matter is not limited in this respect.

Network 420 may comprise one or more communication links, processes, and/or resources to support exchanging communication signals among users, such as user 455, and computing site 410. By way of example but not limitation, network 420 may include wireless and/or wired communication links, telephone or telecommunications systems, Wi-Fi networks, Wi-MAX networks, the Internet, the web, a local area network (LAN), a wide area network (WAN), or any combination thereof.

A computer-readable (storage) medium, such as computer-readable medium 475 of FIG. 3, typically may be non-transitory and/or comprise a non-transitory device. In this context, a non-transitory storage medium may include a device that is tangible, meaning that the device has a concrete physical form, although the device may change its physical state. Thus, for example, non-transitory refers to a device remaining tangible despite a change in state.

The term "computing site" as used herein refers to a system and/or a device that includes a capability to process and/or store data in the form of signals and/or states. Thus, a computing site, in this context, may comprise hardware, software, firmware or any combination thereof (other than software per se). Computing site 410 and as depicted in FIG. 3 and computing sites 100 and 200 of FIG. 1 are merely example computing sites, and the scope of claimed subject matter is not limited to these particular examples. For one or more embodiments, a computing site may comprise any of a wide range of digital electronic devices, including, but not limited to, personal desktop or notebook computers, high-definition televisions, digital versatile disc (DVD) players and/or recorders, game consoles, satellite television receivers, cellular telephones, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by one or more processing unit located at a computing site.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, and/or characteristic in the singular and/or may be used to describe a plurality or some other combination of features, structures and/or characteristics. Though, it should be noted that this is merely an illustrative example and claimed subject matter is not limited to this example.

In the preceding detailed description, numerous specific details have been set forth to provide a thorough understanding of claimed subject matter. However, it will be understood by those skilled in the art that claimed subject matter may be practiced without these specific details. In other instances, methods and/or apparatuses that would be known by one of ordinary skill have not been described in detail so as not to obscure claimed subject matter. Some portions of the preceding detailed description have been presented in terms of logic, algorithms and/or symbolic representations of operations on binary signals or states stored within a memory of a specific apparatus or special purpose computing device or processing unit. In the context of this particular specification, the term specific apparatus or the like includes a general purpose computing device, such as general purpose computer, once it is programmed to perform particular functions pursuant to instructions from program software. Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared or otherwise manipulated as electronic signals and/or states representing information. It has proven convenient at times, principally for reasons of common usage, to refer to such signals and/or states as bits, data, values, elements, symbols, characters, terms, numbers, numerals, information, and/or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "determining," "establishing," "obtaining", "identifying", "selecting", and/or the like may refer to actions and/or processes of a specific apparatus, such as a special purpose computer and/or a similar special purpose computing device. In the context of this specification, therefore, a special purpose computer and/or a similar special purpose computing device is capable of manipulating and/or transforming signals and/or states, typically represented as physical electronic and/or magnetic quantities within memories, registers, and/or other information storage devices, transmission devices, and/or display devices of the special purpose computer and/or similar special purpose computing device. In the context of this particular patent application, the term "specific apparatus" may include a general purpose computing device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

While there has been illustrated and/or described what are presently considered to be example features, it will be understood by those skilled in the relevant art that various other modifications may be made and/or equivalents may be substituted, without departing from claimed subject matter. Additionally, many modifications may be made to adapt a particular situation to the teachings of claimed subject matter without departing from the central concept(s) described herein. Therefore, it is intended that claimed subject matter not be limited to the particular examples disclosed, but that such claimed subject matter may also include all aspects falling within appended claims and/or equivalents thereof.

The invention claimed is:

1. A method of executing computer content, code, or instructions stored as memory states in one or more physical memory devices accessible by one or more processors of a computing device, comprising:

accessing the content, code, or instructions from the one or more physical memory devices for execution by the one or more processors of the computing device;

executing the accessed content, code, or instructions from the one or more physical memory devices of the computing device; and storing, in at least one memory of the computing device, binary digital signal quantities resulting from having executed the accessed content, code, or instructions on the one or more processors of the computing device, wherein the storing of the binary digital signal quantities results, at least in part, from the one or more processors of the computing device executing the accessed content, code, or instructions to assign a split parameter to a local computing site, the split parameter to indicate a portion of a set of electronic documents or at one or more remote computing sites to be replicated at the local computing site relative to a portion of the set of electronic documents at the one or more remote computing sites to be replicated into a posting list entry at the local computing site based on a replication budget to identify a capacity to store replicated electronic documents and replicated posting list entries of electronic documents at the local computing site, and wherein the one or more processors of the computing device executing the accessed content, code, or instructions to generate, in response to one or more search terms received at the local computing site, a first replication threshold based on the split parameter and based on one or more partial scores of the portion of the set of electronic documents at the one or more remote computing sites to be replicated at the local computing site relative to the one or more received search terms, wherein the portion of the set of electronic documents at the one or more remote computing sites comprising partial scores greater than the first replication threshold are to be replicated at the local computing site, and wherein the one or more processors of the computing device executing the accessed content, code, or instructions to generate a second replication threshold based on the split parameter and based on one or more partial scores of posting list entries of the portion of the set of electronic documents stored at the one or more remote computing site relative to the one or more received search terms, wherein the posting list entries, comprising partial scores greater than the second replication threshold, are to be replicated at the local computing site and to reference the electronic documents of the posting list entries stored at the one or more remote computing sites.

2. The method of claim 1, wherein the one or more processors of the computing device executing the accessed content, code, or instructions are further to:
generate, at the local computing site, one or more partial scores of the electronic documents from the one or more remote computing sites based, at least in part, on one or more received query.

3. The method of claim 2, wherein the one or more processors of the computing device executing the accessed content, code, or instructions are further to:
forward one or more received query to a remote computing site of the one or more remote computing sites based, at least in part, on the partial scores of the group of electronic documents.

4. The method of claim 1, wherein the one or more processors of the computing device executing the accessed content, code, or instructions are further to:
replicate, at the local computing site, at least one posting list entry relevant to the one or more received search terms of the one or more electronic documents stored at one of the one or more remote computing sites.

5. The method of claim 1, wherein the one or more processors of the computing device executing the accessed content, code, or instructions are further to:
deliver a result of one or more query prior to generation of the first replication threshold.

6. The method of claim 1, wherein the one or more processors of the computing device executing the accessed content, code, or instructions are further to:
receive the replication budget, prior to generation of the first replication threshold, to be used by the local computing site.

7. An article comprising:
a non-transitory storage medium having stored thereon content, code, or instructions executable by one or more processors of a computing device to:
access the content, code, or instructions from one or more physical memory devices for execution by the one or more processors of the computing device;
execute the accessed content, code, or instructions from the one or more physical memory devices of the computing device; and
store, in at least one memory of the computing device, binary digital signal quantities that will have resulted from the execution of the accessed content, code, or instructions on the one or more processors of the computing device, wherein
the storage of the binary digital signal quantities is to result, at least in part, from the one or more processors of the computing device executing the accessed content, code, or instructions to assign a split parameter to a local computing site, the split parameter to indicate a portion of a set of electronic documents at one or more remote computing sites to be replicated at the local computing site relative to a portion of the set of electronic documents at the one or more remote computing sites to be replicated into a posting list entry at the local computing site based on a replication budget to identify a capacity to store replicated electronic documents and replicated posting list entries of electronic documents at the local computing site, and wherein
the one or more processors of the computing device to execute the accessed content, code, or instructions to generate, in response to one or more search terms received at the local computing site, a first replication threshold based on the split parameter and based on one or more partial scores of the portion of the set of electronic documents at the one or more remote computing sites to be replicated at the local computing site relative to the one or more received search terms, wherein the portion of the set of electronic documents at the one or more remote computing sites to comprise partial scores greater than the first replication threshold are to be replicated at the local computing site, and wherein
the one or more processors of the computing device to execute the accessed content, code, or instructions to generate a second replication threshold based on the split parameter and based on one or more partial scores of posting list entries of the portion of the set of electronic documents stored at the one or more remote computing site relative to the one or more received search terms, wherein the posting list entries, to comprise partial scores greater than the second replication threshold, are to be replicated at the local computing site and to reference the electronic documents of the posting list entries stored at the one or more remote computing sites.

8. The article of claim 7, wherein the non-transitory storage medium additionally to store content, code, or instructions executable by the one or more processors of the computing device to:
request one or more electronic documents to be stored on a shadow index from at least one of the one or more remote computing sites.

9. The article of claim 8, wherein the non-transitory storage medium additionally to store content, code, or instructions executable by one or more processors of a computing device to:
score the one or more electronic documents to be stored at the at least one of the one or more remote computing sites based, at least in part, on one or more received query.

10. The article of claim 9, wherein the non-transitory storage medium additionally to store content, code, or instructions executable by one or more processors of a computing device to:
request the one or more electronic documents, to be stored on the shadow index from the at least one of the one or more remote computing sites, to be scored greater than the first replication threshold.

11. The article of claim 7, wherein the non-transitory storage medium additionally to store content, code, or instructions executable by one or more processors of a computing device to:
request a portion of at least one posting list, the portion of the at least one posting list to comprise an index of electronic documents to be scored greater than the second replication threshold.

12. The article of claim 7, wherein the non-transitory storage medium additionally to store content, code, or instructions executable by one or more processors of a computing device to:
forward a received query to a remote computing site of the one or more remote computing sites based, at least in part, on the one or more electronic document entries of the posting list to be scored relative to the first replication threshold.

13. An apparatus, comprising:

one or more processors of a computing device, the computing device to utilize one or more digital circuits and coupled to one or more physical memory devices to store binary digital signal quantities as physical memory states to:

access content, code, or instructions, via utilization of the one or more digital circuits, from the physical memory devices for execution by the one or more processors of a computing device;

execute, via utilization of the one or more digital circuits, the accessed content, code, or instructions from the one or more physical memory devices of the computing device; and store in at least one memory of the computing device, binary digital signal quantities that will have resulted from the execution of the accessed content, code, or instructions on the one or more processors of the computing device, wherein the storing of the binary digital signal quantities is to result, at least in part, from the one or more processors of the computing device executing the accessed content, code, or instructions to assign a split parameter to a local computing site, the split parameter to indicate a portion of a set of electronic documents at one or more remote computing sites to be replicated at the local computing site relative to a portion of the set of electronic documents at the one or more remote computing sites to be replicated into a posting list entry at the local computing site based on a replication budget to identify a capacity to store replicated electronic documents and replicated posting list entries of electronic documents at the local computing site, and wherein the one or more processors of the computing device are to execute the accessed content, code, or instructions to generate, in response to one or more search terms received at the local computing site, a first replication threshold to be based on the split parameter and to be based on one or more partial scores of the portion of the set of electronic documents at the one or more remote computing sites to be replicated at the local computing site relative to the one or more received search terms, wherein the portion of the set of electronic documents at the one or more remote computing sites to comprise partial scores greater than the first replication threshold to be replicated at the local computing site, and wherein the one or more processors of the computing device are to execute the accessed content, code, or instructions to generate a second replication threshold to be based on the split parameter and to be based on one or more partial scores of posting list entries of the portion of the set of electronic documents to be stored at the one or more remote computing site relative to the one or more received search terms, wherein the posting list entries, to comprise partial scores greater than the second replication threshold, are to be replicated at the local computing site and to reference the electronic documents of the posting list entries stored at the one or more remote computing sites.

14. The apparatus of claim 13, wherein the one or more processors of the computing device to execute the accessed code, content, or instructions additionally to:

store, in a shadow index, a plurality of electronic documents based, at least in part, on the plurality of electronic documents to be scored higher than the first replication threshold.

15. The apparatus of claim 13, wherein the one or more processors of the computing device to execute the accessed code, content, or instructions additionally to:

store, in a forwarding index, the one or more posting lists of electronic documents to be stored at at least one of one or more remote computing sites.

\* \* \* \* \*